(12) United States Patent
Bortnik et al.

(10) Patent No.: US 8,425,331 B2
(45) Date of Patent: Apr. 23, 2013

(54) USER INTERFACE FOR VIEWING AGGREGATED GAME, SYSTEM AND PERSONAL INFORMATION

(75) Inventors: Michal Bortnik, Seattle, WA (US); Paolo V. Malabuyo, Kirkland, WA (US); Steven Ryan Gunn, Bellevue, WA (US); James David Macauley, Bellevue, WA (US); Patrick W. O'Kelley, II, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 518 days.

(21) Appl. No.: 11/006,118

(22) Filed: Dec. 7, 2004

(65) Prior Publication Data

US 2006/0121991 A1  Jun. 8, 2006

(51) Int. Cl.
| A63F 9/24 | (2006.01) |
| A63F 13/00 | (2006.01) |
| G06F 17/00 | (2006.01) |
| G06F 19/00 | (2011.01) |

(52) U.S. Cl.
USPC .............................................. 463/43; 463/42

(58) Field of Classification Search .................... 463/43; 700/129
See application file for complete search history.

(56) References Cited

U.S. PATENT DOCUMENTS

| 5,083,271 A | 1/1992 | Thacher et al. |
| 5,551,701 A | 9/1996 | Bouton et al. |
| 5,563,805 A | 10/1996 | Arbuckle et al. |
| 5,633,484 A | 5/1997 | Zancho et al. |
| 5,674,127 A | 10/1997 | Horstmann et al. |
| 5,708,709 A | 1/1998 | Rose |
| 5,754,176 A | 5/1998 | Crawford |
| 5,768,382 A * | 6/1998 | Schneier et al. .............. 380/251 |
| 5,779,549 A | 7/1998 | Walker et al. |
| 5,791,992 A | 8/1998 | Crump et al. |
| 5,883,955 A | 3/1999 | Ronning |

(Continued)

FOREIGN PATENT DOCUMENTS

| EP | 1520608 A2 | 4/2005 |
| EP | 1 669 117 A1 | 6/2006 |

(Continued)

OTHER PUBLICATIONS

ISA European Patent Office, Search Report of EP 05 11 0463, Feb. 28, 2006, Germany, 3 pages.

(Continued)

Primary Examiner — Michael Cuff
Assistant Examiner — Kevin Y Kim
(74) Attorney, Agent, or Firm — Alleman Hall McCoy Russell & Tuttle LLP (57) ABSTRACT

A user interface for displaying a user profile in a gaming console that communicates to a remote service. A "Gamer Profile" is created that serves as a building block for services and applications that aim to create a social community of gamers and grow relationships among players. In accordance with the present invention, the Gamer Profile is the entirety of information (e.g., metadata) related to a specific user. The Gamer Profile is developed from a set of services that collect and expose this information in a meaningful way to the community. Feedback information may be included that is provided by other users to further enhance the profile. The Gamer Profile also provides for personalization such that users can customize their gaming experience.

17 Claims, 8 Drawing Sheets

U.S. PATENT DOCUMENTS

| | | | |
|---|---|---|---|
| 5,918,010 A | 6/1999 | Appleman et al. | |
| 5,945,988 A | 8/1999 | Williams et al. | |
| 5,970,143 A | 10/1999 | Schneier et al. | |
| 6,020,884 A * | 2/2000 | MacNaughton et al. | 715/747 |
| 6,024,643 A | 2/2000 | Begis | |
| 6,071,194 A | 6/2000 | Sanderson et al. | |
| 6,081,830 A | 6/2000 | Schindler | |
| 6,106,395 A | 8/2000 | Begis | |
| 6,149,519 A | 11/2000 | Osaki et al. | |
| 6,174,237 B1 | 1/2001 | Stephenson | |
| 6,200,216 B1 | 3/2001 | Peppel | |
| 6,203,432 B1 | 3/2001 | Roberts et al. | |
| 6,206,782 B1 | 3/2001 | Walker et al. | |
| 6,219,047 B1 | 4/2001 | Bell | |
| 6,226,618 B1 | 5/2001 | Downs et al. | |
| 6,256,620 B1 | 7/2001 | Jawahar et al. | |
| 6,287,201 B1 | 9/2001 | Hightower | |
| 6,293,865 B1 | 9/2001 | Kelly et al. | |
| 6,322,451 B1 | 11/2001 | Miura | |
| 6,334,214 B1 | 12/2001 | Horstmann | |
| 6,343,990 B1 | 2/2002 | Rasmussen et al. | |
| 6,352,479 B1 | 3/2002 | Sparks, II | |
| 6,359,572 B1 | 3/2002 | Vale | |
| 6,425,828 B2 | 7/2002 | Walker et al. | |
| 6,511,377 B1 | 1/2003 | Weiss | |
| 6,544,126 B2 | 4/2003 | Sawano et al. | |
| 6,572,477 B2 | 6/2003 | Hightower | |
| 6,648,760 B1 | 11/2003 | Nicastro | |
| 6,688,978 B1 | 2/2004 | Herman | |
| 6,699,124 B2 | 3/2004 | Suchocki | |
| 6,708,172 B1 | 3/2004 | Wong et al. | |
| 6,732,197 B1 | 5/2004 | Overy | |
| 6,742,032 B1 | 5/2004 | Castellani et al. | |
| 6,746,332 B1 * | 6/2004 | Ing et al. | 463/42 |
| 6,755,743 B1 | 6/2004 | Yamashita et al. | |
| 6,804,675 B1 | 10/2004 | Knight et al. | |
| 6,805,634 B1 | 10/2004 | Wells et al. | |
| 6,829,569 B1 * | 12/2004 | Drucker et al. | 703/6 |
| 6,839,435 B1 | 1/2005 | Iijima et al. | |
| 6,941,353 B1 | 9/2005 | Lane | |
| 6,979,267 B2 | 12/2005 | Leen et al. | |
| 6,996,444 B2 | 2/2006 | Ach, III | |
| 7,033,276 B2 | 4/2006 | Walker et al. | |
| 7,056,217 B1 | 6/2006 | Pelkey et al. | |
| 7,069,308 B2 | 6/2006 | Abrams | |
| 7,115,033 B1 | 10/2006 | Timperley | |
| 7,192,352 B2 | 3/2007 | Walker et al. | |
| 7,207,011 B2 | 4/2007 | Mulvey et al. | |
| 7,311,608 B1 | 12/2007 | Danieli et al. | |
| 7,422,521 B2 | 9/2008 | Peterson | |
| 7,490,286 B2 | 2/2009 | Commarford et al. | |
| 7,614,955 B2 | 11/2009 | Farnham et al. | |
| 7,730,010 B2 | 6/2010 | Kishore et al. | |
| 7,756,926 B2 | 7/2010 | Tseng et al. | |
| 7,887,419 B2 | 2/2011 | Bortnik et al. | |
| 2001/0010046 A1 | 7/2001 | Muyres et al. | |
| 2002/0002510 A1 | 1/2002 | Sharp et al. | |
| 2002/0023230 A1 | 2/2002 | Bolnick et al. | |
| 2002/0035568 A1 * | 3/2002 | Benthin et al. | 707/102 |
| 2002/0062316 A1 * | 5/2002 | Maehiro | 707/100 |
| 2002/0062350 A1 * | 5/2002 | Maehiro | 709/206 |
| 2002/0082077 A1 * | 6/2002 | Johnson et al. | 463/30 |
| 2002/0082086 A1 | 6/2002 | Scallie | |
| 2002/0082939 A1 | 6/2002 | Clark et al. | |
| 2002/0083145 A1 | 6/2002 | Perinpanathan | |
| 2002/0115488 A1 | 8/2002 | Berry et al. | |
| 2002/0119824 A1 | 8/2002 | Allen | |
| 2002/0142842 A1 * | 10/2002 | Easley et al. | 463/42 |
| 2002/0151366 A1 | 10/2002 | Walker et al. | |
| 2002/0198949 A1 | 12/2002 | Maehiro | |
| 2003/0009549 A1 | 1/2003 | Maehiro | |
| 2003/0043179 A1 | 3/2003 | Gusler et al. | |
| 2003/0045358 A1 * | 3/2003 | Leen et al. | 463/42 |
| 2003/0050115 A1 | 3/2003 | Leen et al. | |
| 2003/0070176 A1 * | 4/2003 | Parker et al. | 725/105 |
| 2003/0104868 A1 | 6/2003 | Okita et al. | |
| 2003/0109301 A1 | 6/2003 | Chudley et al. | |
| 2003/0109305 A1 | 6/2003 | Gavin et al. | |
| 2003/0181242 A1 | 9/2003 | Lee et al. | |
| 2003/0216962 A1 * | 11/2003 | Heller et al. | 705/14 |
| 2004/0088325 A1 | 5/2004 | Elder et al. | |
| 2004/0107283 A1 | 6/2004 | Paddon | |
| 2004/0121835 A1 | 6/2004 | Willis et al. | |
| 2004/0172533 A1 | 9/2004 | DeMello et al. | |
| 2004/0192440 A1 * | 9/2004 | Evans et al. | 463/30 |
| 2004/0198497 A1 * | 10/2004 | Yamashita et al. | 463/43 |
| 2004/0225386 A1 | 11/2004 | Thompson et al. | |
| 2004/0229698 A1 | 11/2004 | Lind et al. | |
| 2005/0054431 A1 | 3/2005 | Walker et al. | |
| 2005/0070359 A1 | 3/2005 | Rodriquez et al. | |
| 2005/0071786 A1 | 3/2005 | Mariani et al. | |
| 2005/0130742 A1 | 6/2005 | Feldman et al. | |
| 2005/0137014 A1 | 6/2005 | Vetelainen | |
| 2005/0154557 A1 * | 7/2005 | Ebert | 702/182 |
| 2005/0170873 A1 | 8/2005 | Fishbach et al. | |
| 2005/0192097 A1 | 9/2005 | Farnham et al. | |
| 2005/0209002 A1 | 9/2005 | Blythe et al. | |
| 2005/0240603 A1 | 10/2005 | Bodin et al. | |
| 2005/0245314 A1 | 11/2005 | Pirich et al. | |
| 2005/0246638 A1 | 11/2005 | Whitten | |
| 2005/0261062 A1 | 11/2005 | Lewin et al. | |
| 2005/0282636 A1 | 12/2005 | O'Brien | |
| 2006/0048132 A1 | 3/2006 | Chen et al. | |
| 2006/0064761 A1 | 3/2006 | Multerer et al. | |
| 2006/0075019 A1 * | 4/2006 | Donovan et al. | 709/203 |
| 2006/0085642 A1 | 4/2006 | Multerer et al. | |
| 2006/0121987 A1 | 6/2006 | Bortnik et al. | |
| 2006/0136964 A1 | 6/2006 | Diez et al. | |
| 2006/0183542 A1 | 8/2006 | Ng et al. | |
| 2006/0191016 A1 | 8/2006 | Ostergren et al. | |
| 2006/0196686 A1 | 9/2006 | Gatto et al. | |
| 2007/0111794 A1 | 5/2007 | Hogan et al. | |
| 2007/0191097 A1 | 8/2007 | Johnson | |
| 2008/0113789 A1 | 5/2008 | Canessa et al. | |
| 2009/0231515 A1 | 9/2009 | Keam et al. | |
| 2011/0136575 A1 | 6/2011 | Bortnik et al. | |

FOREIGN PATENT DOCUMENTS

| | | |
|---|---|---|
| JP | 09-152999 | 6/1997 |
| JP | 2001109714 A | 4/2001 |
| JP | 2002-085852 A | 3/2002 |
| JP | 2002-239251 A | 8/2002 |
| JP | 2003-047778 A | 2/2003 |
| JP | 2003154172 A | 5/2003 |
| JP | 2003-271780 A | 9/2003 |
| JP | 2003281142 A | 10/2003 |
| JP | 2003-337874 A | 11/2003 |
| JP | 2003340161 A | 12/2003 |
| JP | 2004-329914 A | 11/2004 |
| KR | 20010082566 A | 8/2001 |
| KR | 20050003224 A | 1/2005 |
| KR | 1020050105396 A | 11/2005 |
| WO | 00/04458 A1 | 1/2000 |
| WO | 2005092458 A1 | 10/2005 |

OTHER PUBLICATIONS

Suwalski, Pat, "Automotive Computing with Game Console Hardware," Department of Systems and Computer Engineering at Carleton University, Ottawa, Ontario, Canada (Apr. 2005), <http://www.sce.carleton.ca/faculty/wainer/students/dashbox/finalreport.pdf>, 58 pages.

Akkawi, Amjad et al., "A Mobile Gaming Platform for the IMS," Network and System Support for Games, Porc. of 3rd ACM SIGCOMM Workshop on System Support for Games (2004), <http://citeseerx.ist.psu.edu/viewdoc/summary?doi=10.1.1.91.676>, 8 pages.

Huang, Andrew "Bunnie," "Keeping Secrets in Hardware: the Mircrosoft XBox™ Case Study," AI Memo 2002-008, Massachusetts Institute of Technology-artificial intelligence laboratory (May 26, 2002), <http://web.mit.edu/bunnie/www/proj/anatak/AIM-2002-008.pdf>, 15 pages.

Abrash, Michael, "Inside Xbox Graphics—A Powerful Game Platform Waiting in the Wings," drdobbs.com, (Aug. 1, 2000), <http://www.drdobbs.com/184404199>, Access date: Apr. 20, 2010, 9 pages.

Henshaw, Jeff, "Inside Xbox 360: An Interview with Jeff Henshaw," Interview by Paul Thurrott, Paul Thurrott's Supersite for Windows, Jun. 21-Jul. 7, 2005, <http://www.winsupersite.com/showcase/xbox360_inside.asp>, Access date: Apr. 20, 2010, 12 pages.

Larocque, Daniel, "State Pattern in C++ Applications," Codeguru.com (Sep. 17, 2001), <http://www.codeguru.com/cpp/misc/misc/article_php/c3893>, Access date: Apr. 20, 2010, 2 pages.

Japanese Patent Office, Notice of Rejection from Japanese Patent Application No. 2005319924, mailed Aug. 10, 2012, 5 pages.

Patent Office of the P.R. of China, Decision on Rejection of Chinese Patent Application No. 200510119213.7, May 25, 2011, China, 12 pages.

Patent Office of Japan, Notice of Rejection of Japanese Patent Application No. 2005-311712, Jun. 3, 2011, Japan, 4 pages.

* cited by examiner

USER INTERFACE FOR VIEWING AGGREGATED GAME, SYSTEM AND PERSONAL INFORMATION

COPYRIGHT NOTICE/PERMISSION

A portion of the disclosure of this patent document contains material, which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings hereto: Copyright © 2004, Microsoft Corporation, All Rights Reserved.

FIELD OF THE INVENTION

This invention generally relates to the field of gaming and multimedia devices. In particular, the present invention is directed to a system and method of creating and maintaining a unique gaming identity.

BACKGROUND OF THE INVENTION

Conventional gaming systems include a concept of unique identity, which was intended to increase player satisfaction and create a sense of community. However, while the conventional unique identity does minimize the effort required to play online, the unique identity failed to accomplish these goals. One reason for this problem is that multiple players often share an identity because there is no easy way for multiple players to identify themselves on a shared gaming device. This creates confusion as a player using a particular identity during an online gaming session, may not be the same player in the next session or from the previous session.

Further, conventional identities have failed to provide a method for conveying information about players other than a limited set of game achievements. Thus, it is difficult to learn more about a player through the unique identity. For example, players cannot the determine the country or location of other players, cannot record personal greetings or see other players' avatars (display tiles) outside of a specific game, and cannot determine a player's reputation, etc. Therefore, there is a need for a unique identity that is rich, customizable and engaging. The identity should be public and automatically shared with the rest of the community, while protecting a player's privacy. The present invention provides such a solution.

SUMMARY OF THE INVENTION

The present invention is direct to a user interface for displaying a gaming profile. The user interface includes a home screen that displays a base area that includes an identity of a user and a visual image associated with the user, and a menu that includes items to display different types of information related to the gaming profile. The gaming profile is aggregated by a gaming service that receives and stores the user's game achievements, feedback information, personal information and preference information.

In accordance with a feature of the invention, an extended area displays information that is specific to a context of user interface. The extended area includes information regarding at least one of a last game played with another user, feedback, presence information, and game achievements in accordance with the context. The information displayed may be tailored in accordance with a user's privacy settings.

The menu includes options to select among at least one of a friends list, personal user data, usage, favorites, recent players list, reputation, system options and game achievements. The system options may be applied to gaming devices accessed by the user. The user is also provided an area to edit self-described information, where the self-described information is included in the gaming profile. The user's game achievements include accomplishments within gaming applications run on a gaming console.

In addition, a display of game achievements of users in the friends list or the recent player lists may be provided and optionally, a display of the user's presence information.

Additional features and advantages of the invention will be made apparent from the following detailed description of illustrative embodiments that proceeds with reference to the accompanying drawings.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF ILLUSTRATIVE EMBODIMENTS

Figure 1:
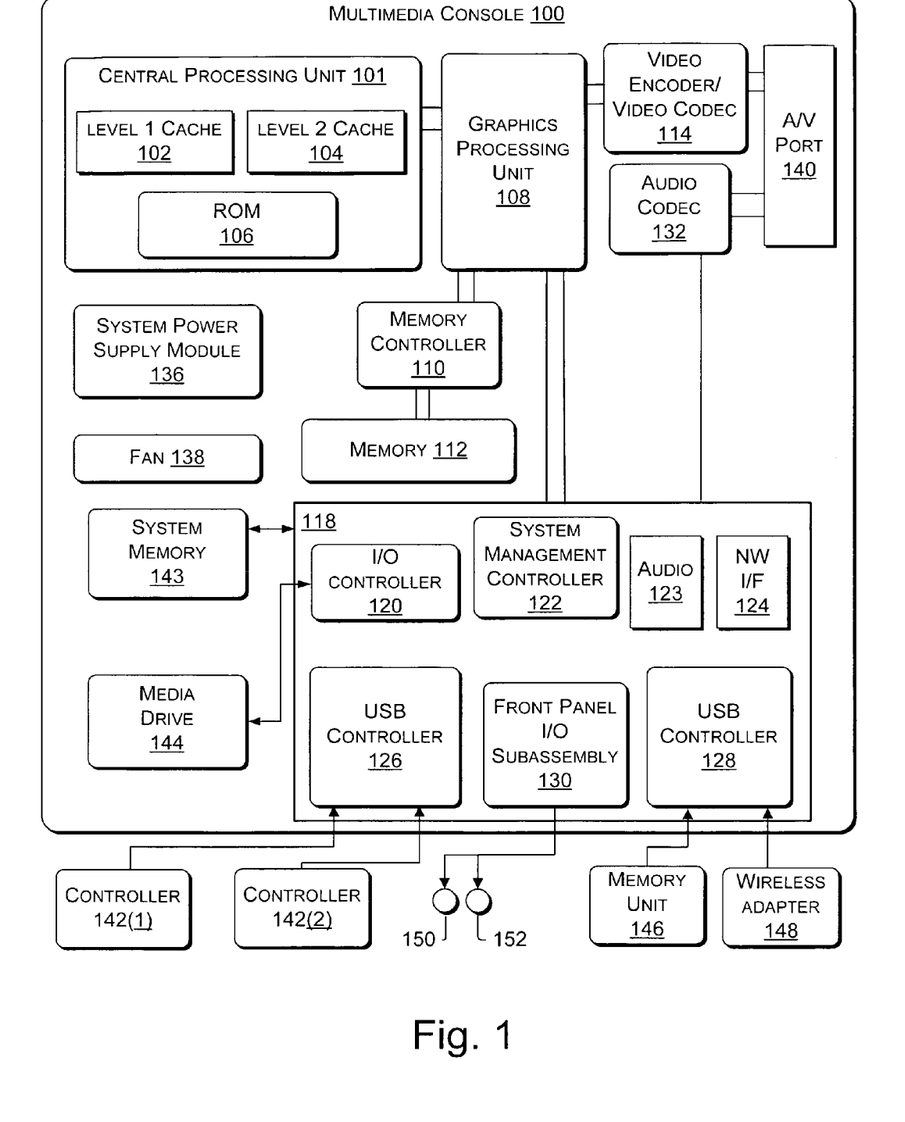
FIG. 1 is a block diagram showing a gaming console in which aspects of the present invention may be implemented.

FIG. 1 illustrates the functional components of a multimedia/gaming console 100 in which certain aspects of the present invention may be implemented. The multimedia console 100 has a central processing unit (CPU) 101 having a level 1 cache 102, a level 2 cache 104, and a flash ROM (Read Only Memory) 106. The level 1 cache 102 and a level 2 cache 104 temporarily store data and hence reduce the number of memory access cycles, thereby improving processing speed and throughput. The CPU 101 may be provided having more than one core, and thus, additional level 1 and level 2 caches 102 and 104. The flash ROM 106 may store executable code that is loaded during an initial phase of a boot process when the multimedia console 100 is powered ON.

A graphics processing unit (GPU) 108 and a video encoder/video codec (coder/decoder) 114 form a video processing pipeline for high speed and high resolution graphics processing. Data is carried from the graphics processing unit 108 to the video encoder/video codec 114 via a bus. The video processing pipeline outputs data to an A/V (audio/video) port 140 for transmission to a television or other display. A memory controller 110 is connected to the GPU 108 to facilitate processor access to various types of memory 112, such as, but not limited to, a RAM (Random Access Memory).

The multimedia console 100 includes an I/O controller 120, a system management controller 122, an audio processing unit 123, a network interface controller 124, a first USB host controller 126, a second USB controller 128 and a front panel I/O subassembly 130 that are preferably implemented on a module 118. The USB controllers 126 and 128 serve as hosts for peripheral controllers 142(1)-142(2), a wireless adapter 148, and an external memory device 146 (e.g., flash memory, external CD/DVD ROM drive, removable media, etc.). The network interface 124 and/or wireless adapter 148 provide access to a network (e.g., the Internet, home network, etc.) and may be any of a wide variety of various wired or wireless adapter components including an Ethernet card, a modem, a Bluetooth module, a cable modem, and the like.

System memory 143 is provided to store application data that is loaded during the boot process. A media drive 144 is provided and may comprise a DVD/CD drive, hard drive, or other removable media drive, etc. The media drive 144 may be internal or external to the multimedia console 100. Application data may be accessed via the media drive 144 for execution, playback, etc. by the multimedia console 100. The media drive 144 is connected to the I/O controller 120 via a bus, such as a Serial ATA bus or other high speed connection (e.g., IEEE 1394).

The system management controller 122 provides a variety of service functions related to assuring availability of the multimedia console 100. The audio processing unit 123 and an audio codec 132 form a corresponding audio processing pipeline with high fidelity and stereo processing. Audio data is carried between the audio processing unit 123 and the audio codec 132 via a communication link. The audio processing pipeline outputs data to the A/V port 140 for reproduction by an external audio player or device having audio capabilities.

The front panel I/O subassembly 130 supports the functionality of the power button 150 and the eject button 152, as well as any LEDs (light emitting diodes) or other indicators exposed on the outer surface of the multimedia console 100. A system power supply module 136 provides power to the components of the multimedia console 100. A fan 138 cools the circuitry within the multimedia console 100.

The CPU 101, GPU 108, memory controller 110, and various other components within the multimedia console 100 are interconnected via one or more buses, including serial and parallel buses, a memory bus, a peripheral bus, and a processor or local bus using any of a variety of bus architectures. By way of example, such architectures can include a Peripheral Component Interconnects (PCI) bus, PCI-Express bus, etc.

When the multimedia console 100 is powered ON, application data may be loaded from the system memory 143 into memory 112 and/or caches 102, 104 and executed on the CPU 101. The application may present a graphical user interface that provides a consistent user experience when navigating to different media types available on the multimedia console 100. In operation, applications and/or other media contained within the media drive 144 may be launched or played from the media drive 144 to provide additional functionalities to the multimedia console 100.

The multimedia console 100 may be operated as a standalone system by simply connecting the system to a television or other display. In this standalone mode, the multimedia console 100 allows one or more users to interact with the system, watch movies, or listen to music. However, with the integration of broadband connectivity made available through the network interface 124 or the wireless adapter 148, the multimedia console 100 may further be operated as a participant in a larger network community.

When the multimedia console 100 is powered ON, a set amount of hardware resources are reserved for system use by the multimedia console operating system. These resources may include a reservation of memory (e.g., 16 MB), CPU and GPU cycles (e.g., 5%), networking bandwidth (e.g., 8 kbs), etc. Because these resources are reserved at system boot time, the reserved resources do not exist from the application's view.

In particular, the memory reservation preferably is large enough to contain the launch kernel, concurrent system applications and drivers. The CPU reservation is preferably constant such that if the reserved CPU usage is not used by the system applications, an idle thread will consume any unused cycles.

With regard to the GPU reservation, lightweight messages generated by the system applications (e.g., popups) are displayed by using a GPU interrupt to schedule code to render popup into an overlay. The amount of memory required for an overlay depends on the overlay area size and the overlay preferably scales with screen resolution. Where a full user interface is used by the concurrent system application, it is preferable to use a resolution independent of application resolution. A scaler may be used to set this resolution such that the need to change frequency and cause a TV resynch is eliminated.

After the multimedia console 100 boots and system resources are reserved, concurrent system applications execute to provide system functionalities. The system functionalities are encapsulated in a set of system applications that execute within the reserved system resources described above. The operating system kernel identifies threads that are system application threads versus gaming application threads. The system applications are preferably scheduled to run on the CPU 101 at predetermined times and intervals in order to provide a consistent system resource view to the application. The scheduling is to minimize cache disruption for the gaming application running on the console.

When a concurrent system application requires audio, audio processing is scheduled asynchronously to the gaming application due to time sensitivity. A multimedia console application manager (described below) controls the gaming application audio level (e.g., mute, attenuate) when system applications are active.

Input devices (e.g., controllers 142(1) and 142(2)) are shared by gaming applications and system applications. The input devices are not reserved resources, but are to be switched between system applications and the gaming application such that each will have a focus of the device. The application manager preferably controls the switching of input stream, without knowledge the gaming application's knowledge and a driver maintains state information regarding focus switches.

The present invention is directed to a "Gamer Profile," which serves as a building block for services and applications that aim to create a social community of gamers and grow relationships among players. In accordance with the present invention, the Gamer Profile is the entirety of information (e.g., metadata) related to a specific user (i.e., the gamer's digital identity). The Gamer Profile is developed from a set of services that collect and expose this information in a meaningful way to the community. The Gamer Profile also provides for personalization -such that users can customize and enhance their gaming experience. As will be discussed in greater detail below, the Gamer Profile consists of various components, including, but not limited to, a Gamercard, game achievements, and gamer preferences.

Figure 2:
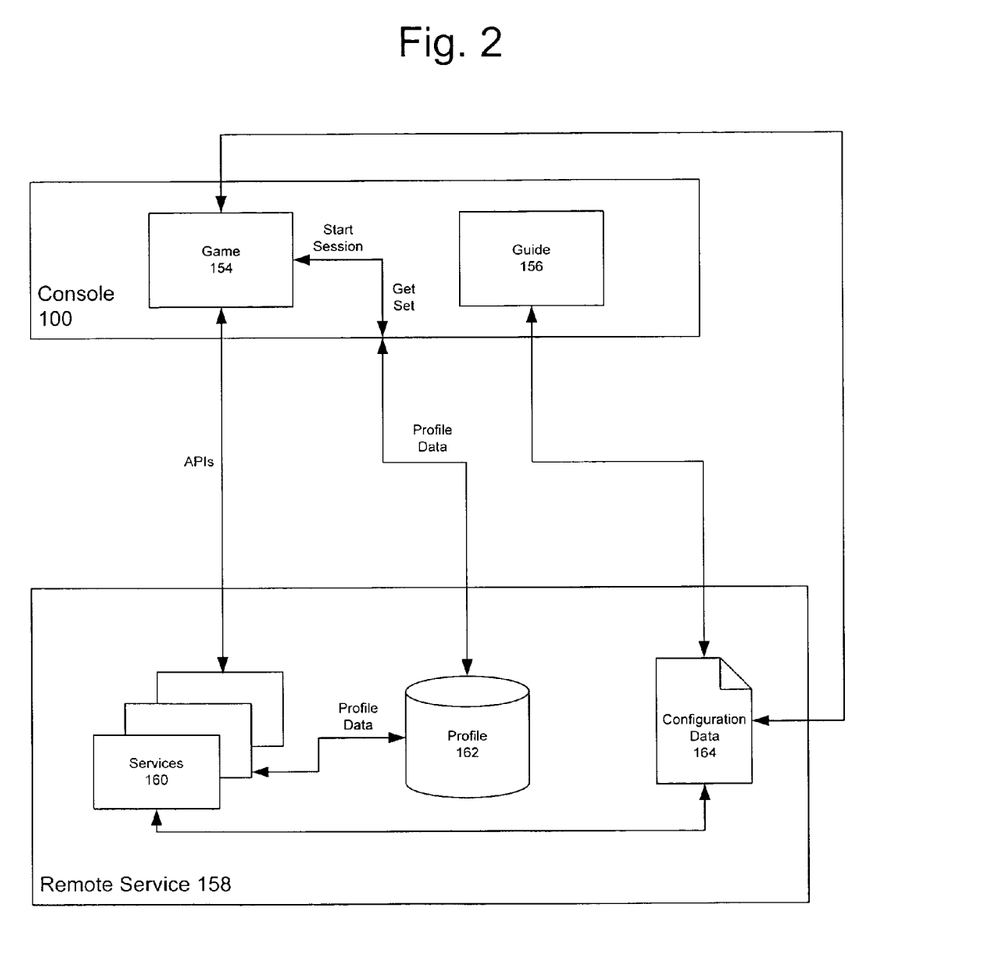
FIG. 2 illustrates an exemplary architecture in which the present invention may be implemented.

Referring to FIG. 2, there is illustrated an overview of an exemplary architecture that may be used to implement the Gamer Profile. The console 100 interacts with a remote service 158 that provides services 160 such as voice/chat, a friends list, matchmaking, content download, roaming, feedback, tournaments, voice messaging, and updates to gamers.

The service 158 also maintains the Gamer Profiles in a profile database 162 and configuration data 164 used by the services 160 and games 154. The service 158 collects Gamer Profiles, aggregates, processes information supplied by other services 160, and fulfills real-time client requests for retrieving Gamer Profile-related services. The Gamer Profiles in the database 162 are also used by the games 154 to enable, among other things, personalization and customization, etc.

Using the console 100, the user may interact with a guide 156. The guide 156 provides an interface where the user may navigate to, and enter, various online areas and options provided by the service 158. The configuration data 164 stored by the service 158 may be used to determine features and options provided by the guide 156. When the game 154 is running, a defined set of APIs are used to call and interact with the services 160. When requesting Gamer Profile information via the APIs, the game 154 may pass a unique identifier of a user. The service 158 may return a Gamercard (discussed below), game stats, game achievements, affiliations, game settings. etc. Additional details of the various aspects of the exemplary architecture are provided below.

Figure 3:
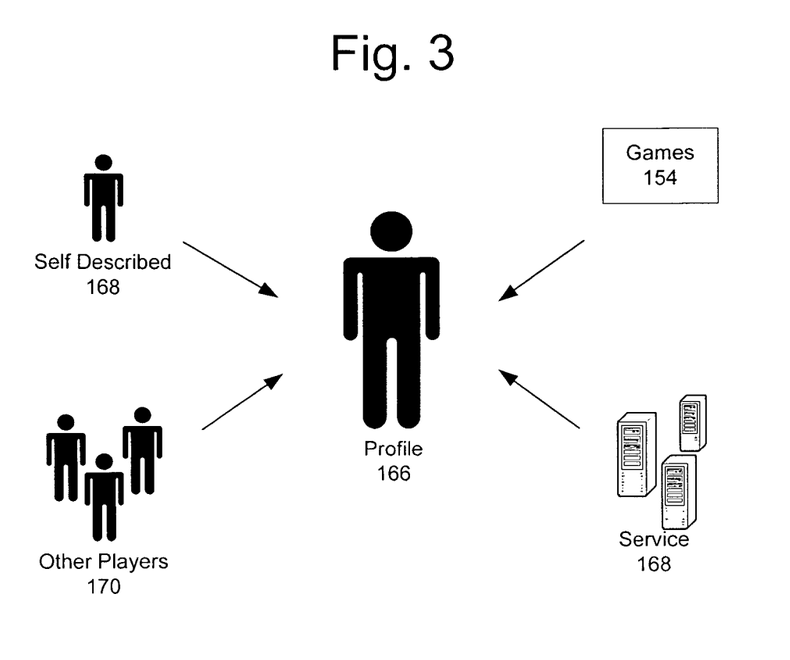
FIG. 3 illustrates sources of information that provide input to a Gamer Profile.

Referring to FIG. 3, the Gamer Profile 166 is created when a user creates a profile (selected from the guide 156) and chooses his/her unique Gamertag (a user's unique name), tile (picture/avatar associated with the user) other options during an account sign-up phase. From there, a base Gamer Profile 166 is created. The Gamer Profile 166 may then be populated from several sources. For example, the Gamer Profile 166 may include self-described data 168 from the Gamer Profile owner. Other gamers 170 can provide feedback regarding the Gamer Profile owner. The service 158 may track the gamer's online and offline activity. In addition, the games 154 may report the gamer's statistics and game achievements.

The owner of Gamer Profile can edit his/her Gamer Profile 166 directly and control who can view each section of the Gamer Profile. The Gamer Profile 166 may be edited via general fields (e.g., tile, country, language, gender, greeting, etc.) and/or system settings (e.g., voice output, controller vibration, character name, game format, game mode, etc.). Privacy/Opt-out Settings can be tuned for the Gamer Profile to, e.g., restrict presence information only to friends, allow game achievements to be visible to all, etc.

The Gamer Profile 166 may include feedback provided by other players 170. Feedback helps others learn about a particular gamer. For example, if the gamer uses foul language or aggressive play in game sessions, other gamers may submit feedback to the service 158. The feedback mechanism improves the user experience by building reputations. Players are therefore anonymous, but not unknown because of the accumulated feedback.

In another aspect of the invention, the service 158 and games 154 track online and offline activity of gamers to provide usage statistics in the Gamer Profile 166. When a gamer plays online, a particular game title is added to list of games played that is made visible to others. While offline, the game console 100 and game 154 track the gamer's activity via a mechanism for instrumenting games to collect detailed information about a specific player's in-game statistics and accomplishments. The Gamer Profile 166 is updated during the next connection to the service 158 to reflect the offline play. Game achievements may be reported to the service 154 by games via the Gamer Profile data mechanism.

As noted above the Gamer Profile 166 may be used for customization and preference setting on a global level, as well as a per game level. Gamer preferences aid games 154 in choosing defaults for common settings such as game profile name, controller inversion and controller vibration, etc. For example, if a gamer likes using an inverted controller, this preference will be used for new titles as they are played. Games 154 have access to Gamer Profiles via the database 162 and services 160. In addition, game usage data can be mined to tune the game 154 to the user's particular preferences and game features updated after the initial game launch.

A presence service may be included to provide information about users' whereabouts and activities. Presence information will be available to those users the gamer wishes to share it. The Gamer Profile will be the primary way to access the presence information.

Referring to FIGS. 4-13, the Gamer Profile can be viewed in a number of ways and forms, and is typically displayed in the Gamercard 172. The Gamercard 172 is the visual representation of the Gamer Profile 166 that is available to games on the console 100 and, e.g., the web. The Gamercard 172 serves as a summary or snapshot of a player's Gamer Profile 166. Gamers may use the Gamercard to set up a matchmaking list where gamers are added to a preferred players list to play again in the future.

Figure 4:
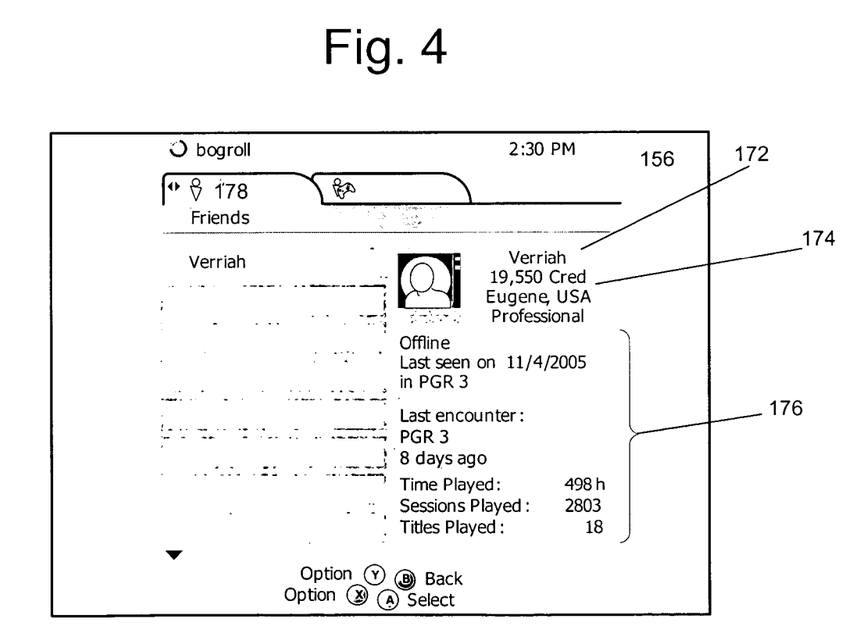
FIGS. 4-13 illustrate various graphical user interfaces in accordance with the present invention.

As shown in FIG. 4, the Gamercard 172 may be divided into two regions, a base area 174 and a context-specific (or extended) area 176. The base area 174 is provides a set of Gamer Profile information in a standard and consistent way across multiple contexts, whereas the extended area 176 may be customized to fit a specific context. Although the Gamercard 172 of FIGS. 4-13 are shown in the context of the guide 156, the Gamercard 172 may be visually separated from the rest of the screen and adopt the background color of the screen it is displayed on. In addition, the Gamercard 172 may be temporarily replaced by an animation while it is being loaded for viewing.

The base area 174 may be provided in different variants corresponding to differing contexts, while being a consistent view within each context. For example, an online Gamercard 172 is shown when one player is looking at another player's Gamercard 172 during an online session. The online base area 174 includes details such as the player's Gamertag, gamer tile, overall community rating, gamer Cred (a points-based reward points system), gamer zone, country, membership tier, awards, etc. An offline Gamercard 172 is shown when a player is looking at his/her own Gamercard 172. The offline base area 174 may include a subset of the online base area and may further include information regarding titles played and time played. The base area 174 of a Gamercard 172 is preferably fixed in size, has a consistent, static layout and has a fixed placement of all information elements, such as Tile or Gamer Cred.

The extended area 176 may include a set of Gamercard Actions, such as "View Profile" and "Send Feedback," etc. The extended area of the Gamercards is preferably not fixed in size, because it may vary based on the context. As shown in FIGS. 4-12 a user may scroll through the list of other users via the guide 156 and a friends list 178. The Gamercard for other users may be displayed as the user scrolls among his/her friends or the user may be presented with an option to see a full view of the Gamer Profile. The full view mode consists of different views of the extended area 176 and may include several sections, such as a Profile Summary, Community Feedback, Game Achievements, Activity, and Social Network. The guide 156 may advance through the list of friends, recent players (and summary sections for each player), a user home page for navigating to various options and settings, etc.

The profile summary includes information regarding number of games played, time played, tile, greeting, etc. The community feedback includes ratings on style, sportsmanship, language, cooperation, etc. The game achievements section includes recent titles, experience points (gamer Cred), time played, game-specific stats and achievements, etc. The activity section includes Gamer Cred earned, sessions played, total time played, active days on the service, etc. The social network includes friends, groups, positive/negative feedback count, etc.

Figure 5:
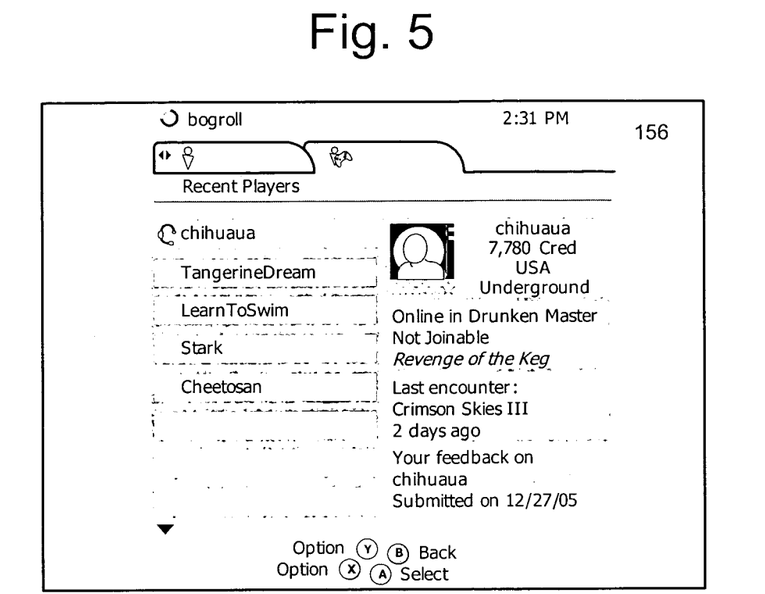
Figure 6:
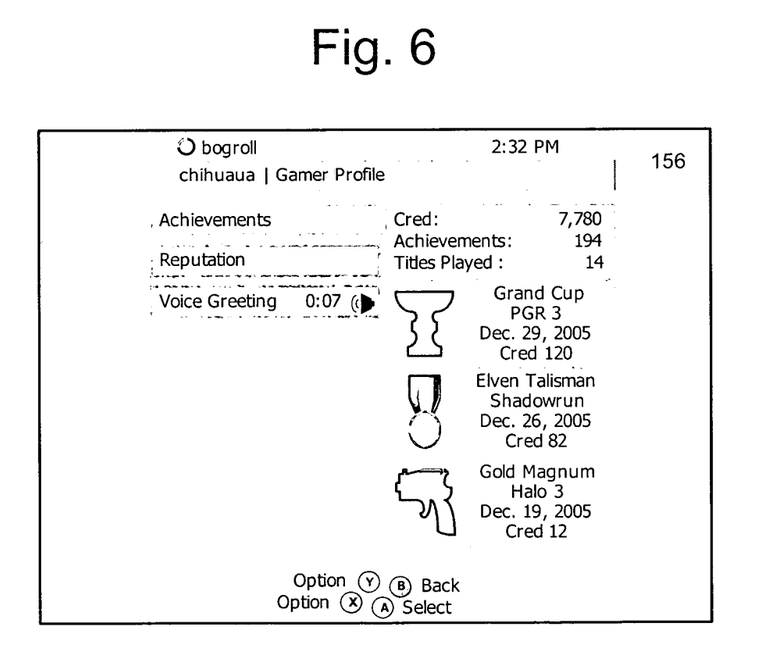
Figure 7:
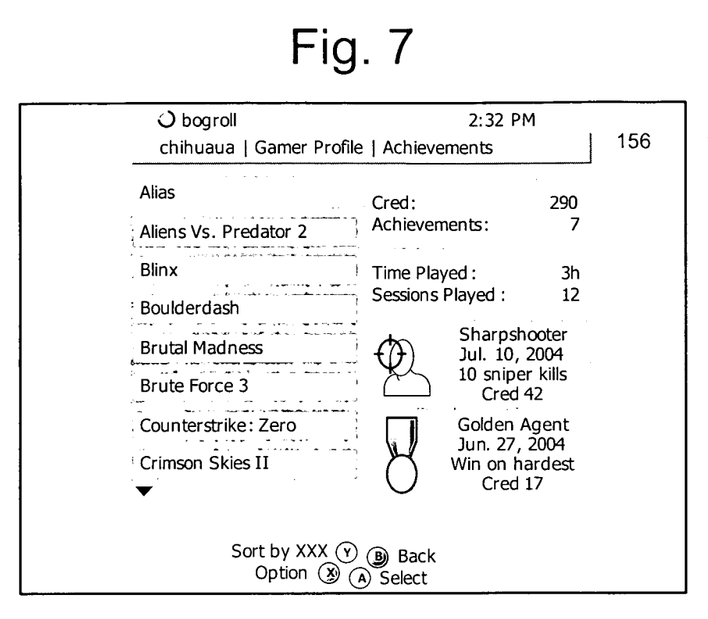
Figure 8:
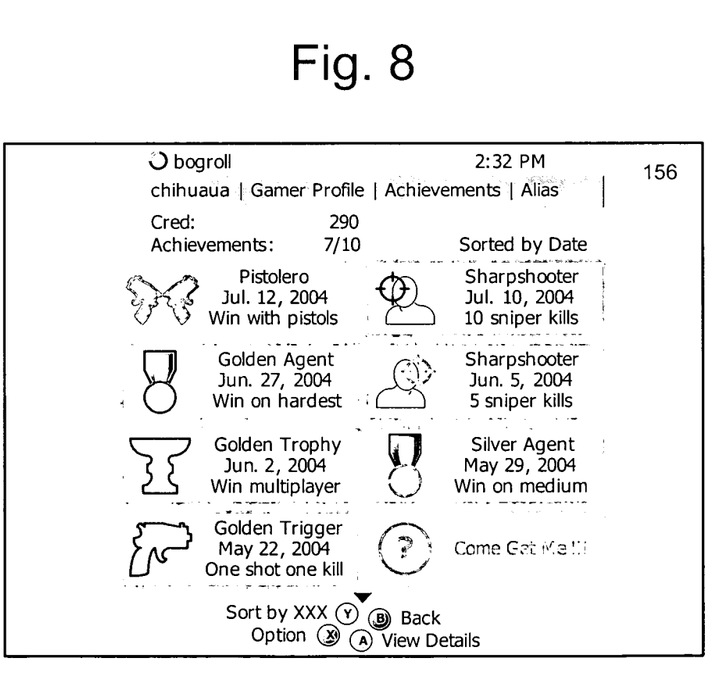

In accordance with the above, FIG. 5 illustrates a list of Recent Players in the guide 156. The Gamercard displayed in when browsing recent players may shown the base area and an extended area that provides information regarding recent games, feedback, and presence of the recent players. FIGS. 6-8 illustrate further details that may be obtained about recent players, such as general achievements and gamer Cred (FIG. 6); game specific achievements, gamer Cred, times/sessions played (FIG. 7); and a date-sorted achievement display (FIG. 8).

Figure 9:
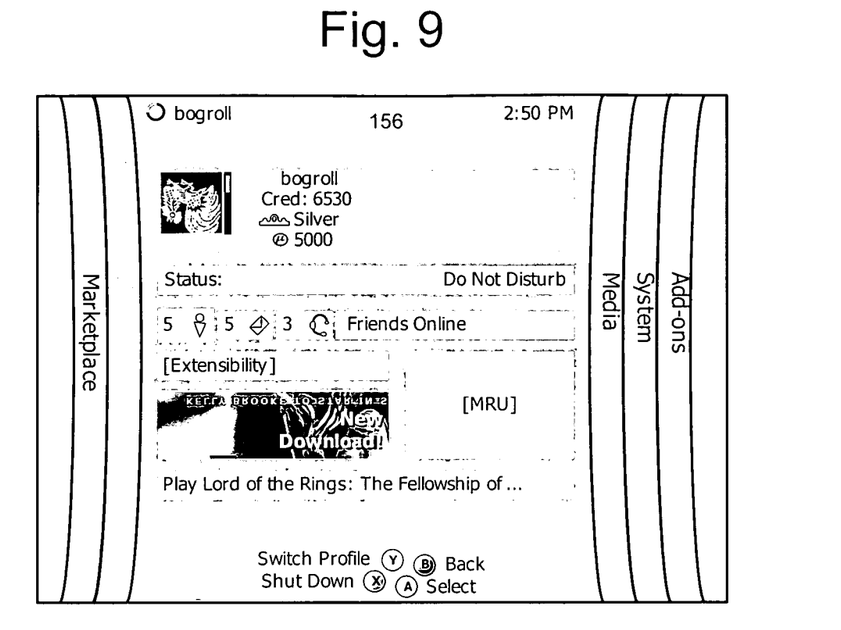
Figure 10:
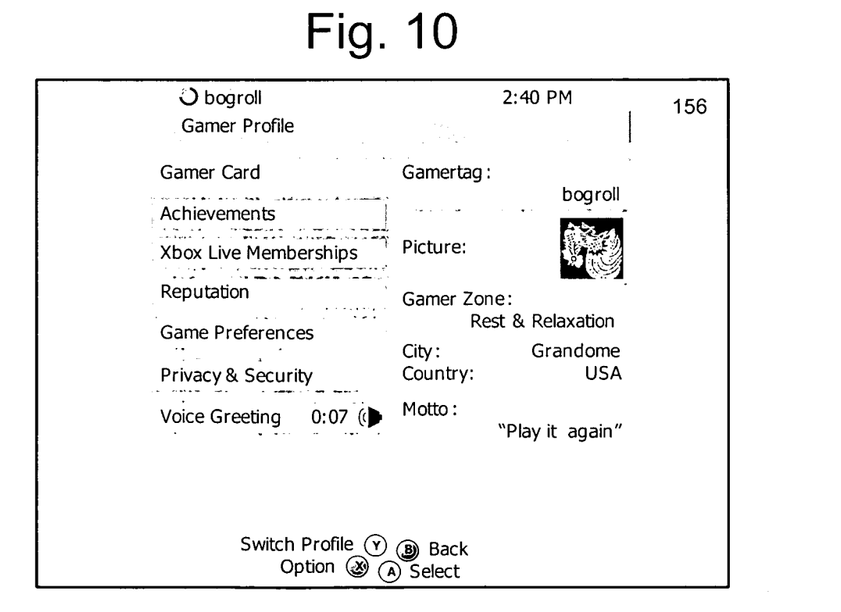
Figure 11:
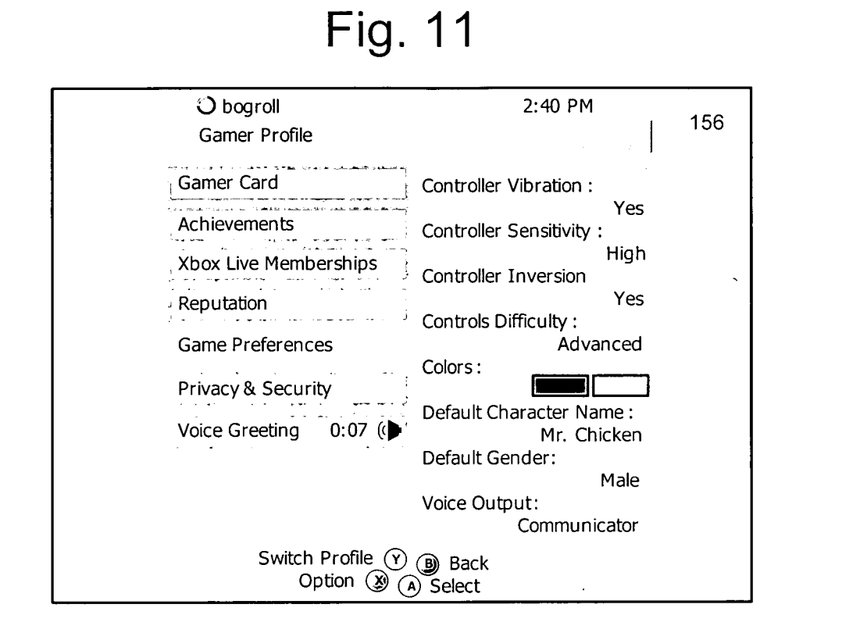
Figure 12:
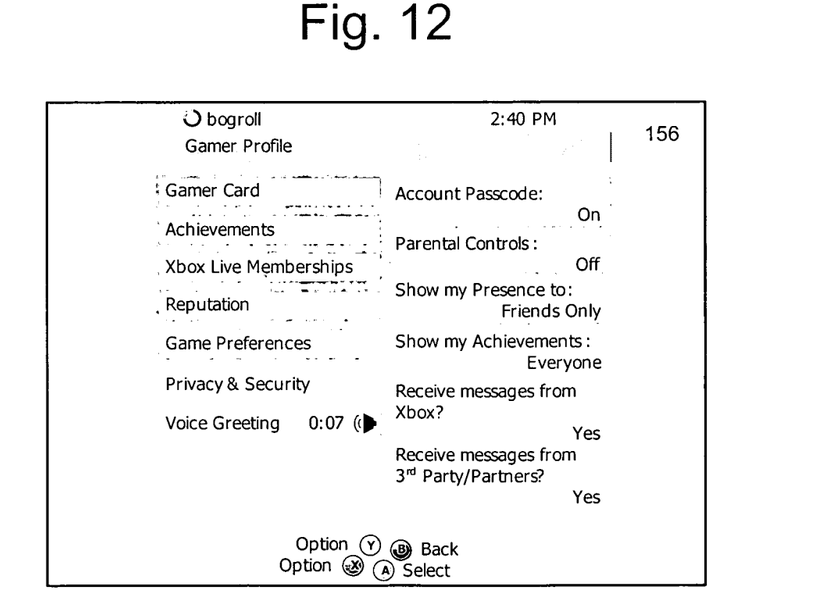
Figure 13:
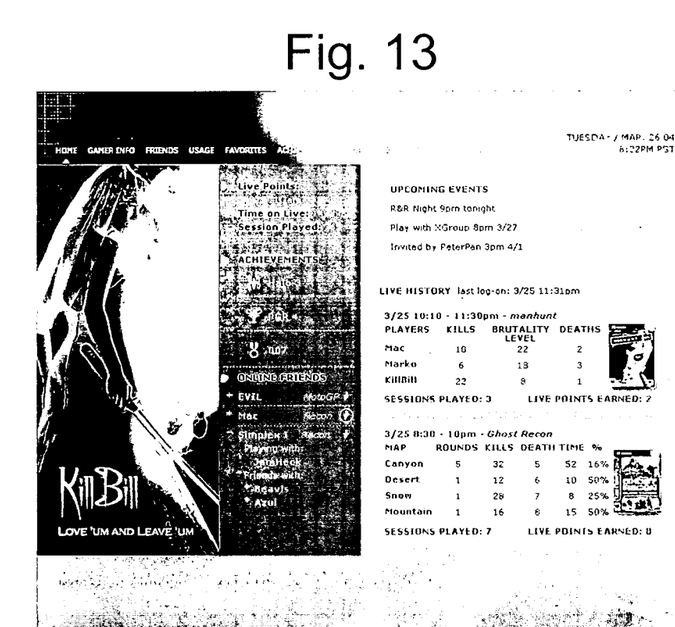

FIG. 9 illustrates an exemplary user home page from which the user may navigate among the various options provided by the service 158, edit Gamercard information, change game settings, set preferences and privacy settings, etc. Such settings and preferences may be accessed using the exemplary user interfaces of FIGS. 10-12. FIG. 13 illustrates another exemplary home page in accordance with the present invention.

In accordance with the present invention, there may be differences, however, between how the guide 156, games 154 and players trigger Gamer Profile viewing. One instance is a user-instantiated Gamercard. Here, if a user receives a request from another gamer, the user may pause the game 154 and brings up the Gamercard 172 to find out who is sending the request. There may also be a game-instantiated Gamercard 172, where a user can select to view the Gamercard 171, which brings up a Gamercard system application.

It is noted that the user interface of FIGS. 4-13 are provided for exemplary purposes only and are not intended to limit the invention as recited in the claims. Those of ordinary skill in the art will understand that there are various modifications that will fall within the scope of the appended claims.

While the present invention has been described in connection with the preferred embodiments of the various FIGS., it is to be understood that other similar embodiments may be used or modifications and additions may be made to the described embodiment for performing the same function of the present invention without deviating therefrom.

What is claimed:

1. A computer system, comprising:
   an Internet interface configured to receive information stored on a networked gaming service;
   a logic assembly;
   memory storing instructions executable by the logic assembly to:
   identify a local user and a visual image associated with said local user;
   identify from information received via the networked gaming service statistics and achievements pertaining to a plurality of video games of different types played by the local user;
   identify from information received via the networked gaming service community feedback provided by other players regarding the local user;
   responsive to an input from the local user, identify from information received via the networked gaming service aspects of a gamer profile of a remote user, the gamer profile of the remote user including statistics and achievements for a plurality of gaming applications that are associated with the remote user; and
   display a user interface including:
   a base area presenting an identity of the local user and the visual image associated with the local user;
   an extended area presenting the statistics and achievements organized according to gaming application title and presenting the community feedback; and
   a remote gamer area presenting the aspects of the gamer profile of the remote user.

2. The computer system of claim 1, wherein the user interface further includes at least one area configured to depict profile data including information regarding at least one of said local user's interaction with said gaming applications, preferences, game achievements and reward points, and where said area is configured to display said information in response to a user input.

3. The computer system of claim 1, wherein the user interface is configured to display information that identifies a gaming application that the remote user is playing and a link operable to execute the gaming application and connect to a server hosting the gaming application that the remote user is playing, the interface further configured to display community feedback information about said remote user comprising information about the remote user's gaming style.

4. The computer system of claim 1, wherein the user interface is selectable via a guide, wherein said guide provides navigation options for selecting select different types of information stored on the networked gaming service.

5. The computer system of claim 4, wherein said different types of information include at least one of a friends list, personal user data, usage, favorites, recent players list, reputation, system options and game achievements.

6. The computer system of claim 4, wherein the user interface further includes an area configured to edit a user profile stored on the networked gaming service.

7. The computer system of claim 1, wherein an area of the user interface is configured to display presence information associated with the remote user, and wherein said extended area includes information regarding at least one of a last game played with another user, feedback, presence information, and game achievements.

8. The computer system of claim 1, wherein the achievements include descriptions, images of trophies, and titles, and the achievements are earned by completing in-game activities.

9. The computer system of claim 1, wherein the memory further stores instructions executable by the logic assembly to receive from the networked gaming service an indication of whether the remote user is available to be joined in a game, and wherein the user interface presents the indication.

10. The computer system of claim 1, wherein the statistics and achievements are earned by completing in-game activities.

11. The computer system of claim 10, wherein the networked gaming service updates the statistics and achievements in real-time responsive to in-game activities changing said statistics and achievements, and wherein the user interface presents the updated statistics and achievements.

12. A computer system, comprising:
   an interface configured to receive information from a remote gaming service;
   a logic assembly; and
   memory storing instructions executable by the logic assembly to:
   receive a navigation command to navigate to a local user area;
   receive from the remote gaming service aspects of a gamer profile of the local user, the gamer profile of the local user including achievements pertaining to a plurality of different video games played by the local user;

responsive to the navigation command to navigate to the local user area, display aspects of the gamer profile of the local user including the achievements pertaining to the plurality of different video games played by the local user;

receive a navigation command to navigate to a remote user area;

receive from the remote gaming service aspects of a gamer profile of one or more remote users, each gamer profile of a remote user including achievements pertaining to a plurality of different video games played by that remote user;

responsive to the navigation command to navigate to the remote user area, display aspects of one or more gamer profiles of the one or more remote users including the achievements pertaining to the plurality of different video games played by each such remote user.

13. The computer system of claim 12, wherein the achievements are earned by completing in-game activities.

14. The computer system of claim 13, wherein the remote gaming service updates the achievements in real-time responsive to in-game activities changing said achievements, and wherein the received achievements are real-time updated achievements.

15. A computer system, comprising:
an interface configured to receive information from a remote gaming service;
a logic assembly; and
memory storing instructions executable by the logic assembly to:
receive a navigation command to navigate to a remote user area;
receive from the remote gaming service a listing of one or more remote users and presence information for each such remote user, the presence information for each remote user identifying online/offline status for that remote user;
display the listing of one or more remote users;
receive a selection command to select a particular one of the one or more remote users;
receive from the remote gaming service achievements pertaining to a plurality of different video games played by the particular remote user;
responsive to the selection command, display a gamer card of the particular remote user, the gamer card presenting the achievements.

16. The computer system of claim 15, wherein the achievements are earned by completing in-game activities.

17. The computer system of claim 16, wherein the remote gaming service updates the achievements in real-time responsive to in-game activities changing said achievements, and wherein the received achievements are real-time updated achievements.

* * * * *